(12) United States Patent
Chen et al.

(10) Patent No.: US 10,310,739 B2
(45) Date of Patent: Jun. 4, 2019

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventors: Chien-Wen Chen, Taoyuan (TW); Che-Yueh Kuo, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/690,286

(22) Filed: Aug. 30, 2017

(65) Prior Publication Data

US 2019/0012080 A1    Jan. 10, 2019

(30) Foreign Application Priority Data

Jul. 7, 2017  (TW) .............................. 106122798 A

(51) Int. Cl.
   G06F 12/00       (2006.01)
   G06F 3/06        (2006.01)
   G06F 12/02       (2006.01)

(52) U.S. Cl.
   CPC ............ G06F 3/061 (2013.01); G06F 3/0655 (2013.01); G06F 3/0679 (2013.01); G06F 12/0253 (2013.01); G06F 2212/7205 (2013.01)

(58) Field of Classification Search
   None
   See application file for complete search history.

(56) References Cited

U.S. PATENT DOCUMENTS

| 2009/0319720 | A1* | 12/2009 | Stefanus | ............. G06F 12/0246 711/103 |
| 2012/0054414 | A1* | 3/2012 | Tsai | .................... G06F 12/0246 711/103 |
| 2016/0232088 | A1* | 8/2016 | Mohan | ................ G06F 12/0246 |

FOREIGN PATENT DOCUMENTS

TW           201709063          3/2017

OTHER PUBLICATIONS

Office Action of Taiwan Counterpart Application, dated Feb. 23, 2019, pp. 1-6.

\* cited by examiner

*Primary Examiner* — Daniel D Tsui
(74) *Attorney, Agent, or Firm* — JCIPRNET

(57) ABSTRACT

A memory management method is provided according to an exemplary embodiment of the disclosure. The method includes: obtaining a valid data parameter based on a valid data amount of valid data stored in a plurality of physical erasing units, and obtaining a first threshold value based on the valid data parameter. The method also includes: obtaining a first determination parameter based on a number of a plurality of first physical erasing units, and the first physical erasing units are physical erasing units being programmed for storing data by using a single-page programming mode. The method further includes: performing a garbage collection operation if the first determination parameter is greater than the first threshold value.

22 Claims, 8 Drawing Sheets

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 106122798, filed on Jul. 7, 2017. The entirety of the above-mentioned patent application is hereby incorporated by reference herein and made a part of this specification.

BACKGROUND

Technology Field

The present disclosure relates to a memory management method of a rewritable non-volatile memory module, and a memory control circuit unit and a memory storage device using the method.

Description of Related Art

Along with the fast development of digital cameras, cell phones, and MP3 players in recently years, the consumers' demand to storage media has increased drastically. Because a rewritable non-volatile memory is capable of providing features such as data non-volatility, low power consumption, small volume, and non-mechanical structure, high reading and writing speed, the rewritable non-volatile memory has become a very popular part in the electronic industry. For example, a solid state drive (SSD) which utilizes a flash memory as its storage medium is widely applied as a hard disk drive of a computer host to improve access performance of the computer.

Generally, a memory storage device including the rewritable non-volatile memory module releases available physical erasing units by performing a garbage collection operation (which is also referred to as a valid data merge operation). For example, the memory storage device, when being in an idle state, may enter a background execution mode. In the background execution mode, when the number of the physical erasing units that data is already stored therein is greater than a fixed value, the memory storage device may perform the garbage collection operation.

However, when the host system continuously sends write commands to cause data belonging to a specific logical address to be update constantly, the memory storage device may continuously mark physical programming units storing old data as invalid and store new data into another physical programming unit. In such condition, as the number of times of the write operations increases, the number of physical programming units that data is already stored therein may also increase even though an actual valid data amount does not increase, such that the number of physical erasing units that data is already stored therein is usually greater than the aforementioned fixed value. In such situation, even though there are sufficient storage spaces in the rewritable non-volatile memory module for storing data, the memory storage device may still frequently perform the garbage collection operation, and as a result, the overall operation performance is influenced.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory management method, a memory storage device and a memory control circuit unit capable of reducing a frequency of performing a garbage collection operation, thereby enhancing overall operation performance.

According to an exemplary embodiment, a memory management method for a rewritable non-volatile memory module having a plurality of physical erasing units is provided. The memory management method includes obtaining a valid data parameter based on a valid data amount of valid data stored in at least a part of the physical erasing units, and obtaining a first threshold value based on the valid data parameter. The memory management method further includes obtaining a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit. The memory management method further includes performing a garbage collection operation if the first determination parameter is greater than the first threshold value.

According to an exemplary embodiment of the disclosure, a memory control circuit unit configured to control a rewritable non-volatile memory module having a plurality of physical erasing units is provided. The memory control circuit unit includes a host interface, a memory interface and a memory management circuit. The host interface is configured to be connected to a host system, the memory interface is configured to be connected to the rewritable non-volatile memory module and the memory management circuit is connected to the host interface and the memory interface. The memory management circuit is configured to obtain a valid data parameter based on a valid data amount of valid data stored in at least a part of the physical erasing units. The memory management circuit is further configured to obtain a first threshold value based on the valid data parameter. The memory management circuit is further configured to obtain a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit. If the first determination parameter is greater than the first threshold value, the memory management circuit is further configured to perform a garbage collection operation.

According to an exemplary embodiment of the disclosure, a memory storage device including a connection interface unit, a rewritable non-volatile memory module and a memory control circuit unit is provided. The connection interface unit is configured to be connected to a host system. The rewritable non-volatile memory module has a plurality of physical erasing units. The memory control circuit unit is connected to the connection interface unit and the rewritable non-volatile memory module. The memory control circuit unit is configured to obtain a valid data parameter based on a valid data amount of valid data stored in at least a part of the physical erasing units. The memory control circuit unit is further configured to obtain a first threshold value based on the valid data parameter. The memory control circuit unit is further configured to obtain a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit. If the first determination parameter is greater than the first threshold value, the memory control circuit unit is further configured to perform a garbage collection operation.

Based on the above, the memory management method, the memory control circuit unit and the memory storage device, provided by the embodiments of the disclosure, are capable for obtaining a threshold value for determining whether to perform the garbage collection operation based on the valid data amount of the valid data stored in the physical erasing units. Thereby, the threshold value can be dynamically adjusted along with the change of the valid data amount. In this way, a start time of the garbage collection operation can be delayed, and thus, the issue that the garbage collection operation is frequently performed due to the threshold value being a fixed value can be improved to enhance overall operation performance.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
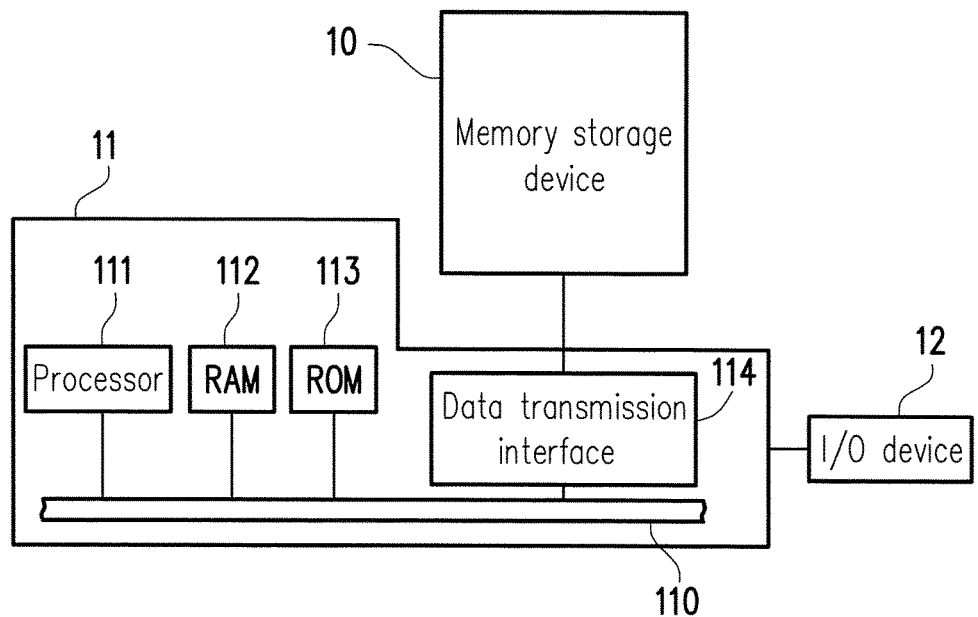
FIG. 1 is a schematic block diagram illustrating a host system, a memory storage device and an input/output (I/O) device according to an exemplary embodiment.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a rewritable non-volatile memory module and a controller (which is also referred to as a control circuit unit). The memory storage device is usually used together with a host system, such that the host system can write data into the memory storage device or read data from the memory storage device.

Figure 2:
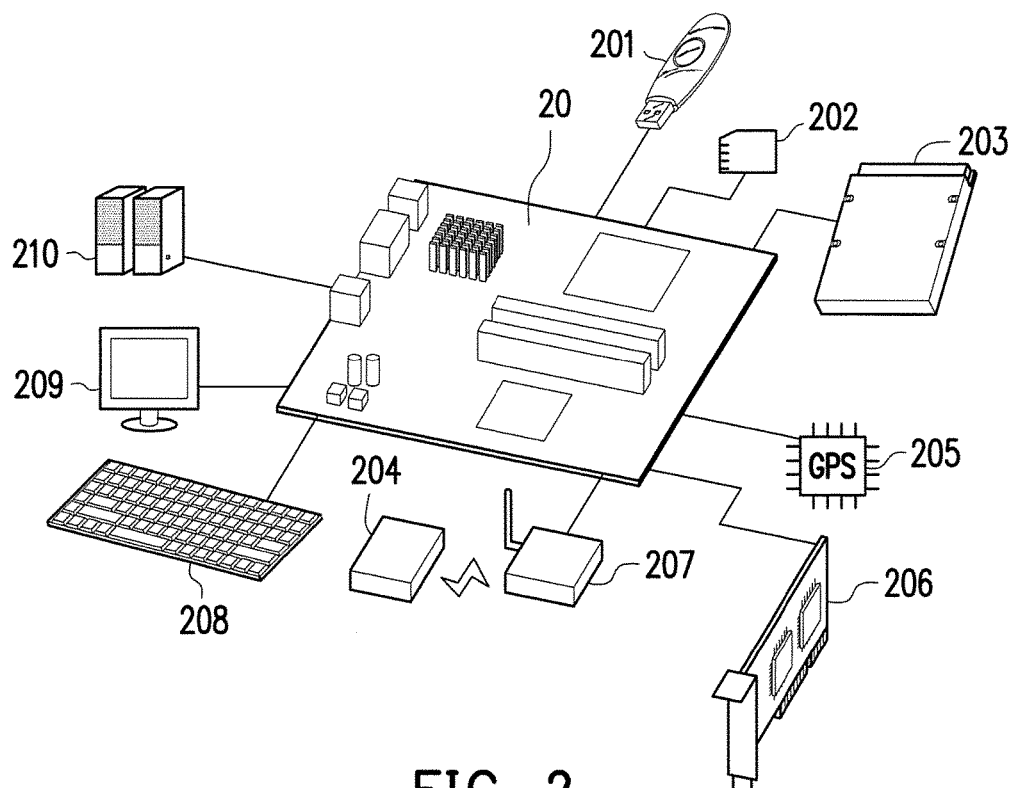
FIG. 2 is a schematic block diagram illustrating a host system, a memory storage device and an I/O device according to another exemplary embodiment.

FIG. 1 is a schematic block diagram illustrating a host system, a memory storage device and an input/output (I/O) device according to an exemplary embodiment, and FIG. 2 is a schematic block diagram illustrating a host system, a memory storage device and an I/O device according to another exemplary embodiment.

Referring to FIG. 1 and FIG. 2, a host system 11 generally includes a processor 111, a random access memory (RAM) 112, a read only memory (ROM) 113 and a data transmission interface 114. The processor 111, the RAM 112, the ROM 113 and the data transmission interface 114 are all connected to a system bus 110.

In the present exemplary embodiment, the host system 11 is connected to the memory storage device 10 through the data transmission interface 114. For example, the host system 11 may write data into the memory storage device 10 or read data from the memory storage device 10 through the data transmission interface 114. In addition, the host system 11 is connected to the I/O device 12 through the system bus 110. For example, the host system 11 may transmit output signals to the I/O device 12 or receive input signals from the I/O device 12 through the system bus 110.

In the present exemplary embodiment, the processor 111, the RAM 112, the ROM 113 and the data transmission interface 114 may be disposed on a mainboard 20 of the host system 11. The number of the data transmission interface 114 may be one or a plurality. Through the data transmission interface 114, the main board 20 may be connected to the memory storage device 10 in a wired manner or a wireless manner. The memory storage device 10 may be, for example, a flash drive 201, a memory card 202, a solid state drive (SSD) 203 or a wireless memory storage device 204. The wireless memory storage device 204 may be, for example, a memory storage device based on various wireless communication technologies, such as a near field communication storage (NFC) memory storage device, a WiFi memory storage device, a Bluetooth memory storage device, a low power consumption Bluetooth memory storage device (e.g., iBeacon). Additionally, the mainboard 20 may also be connected to various I/O devices, such as a global positioning system (GPS) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
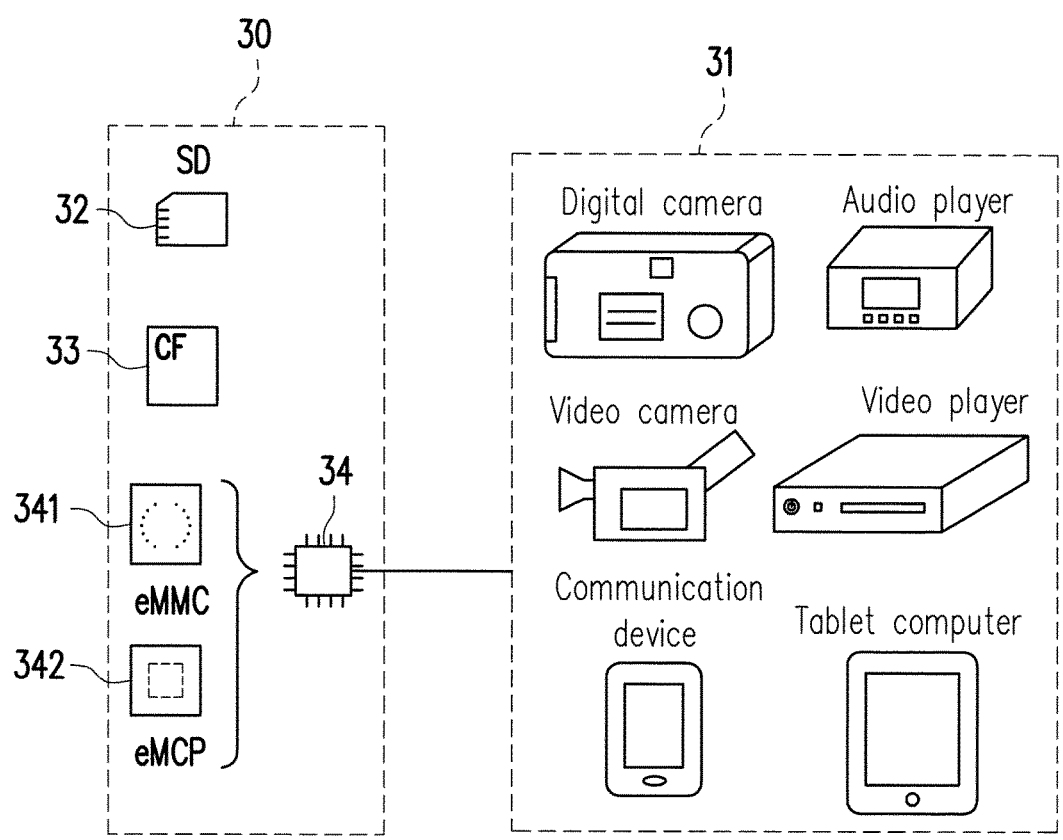
FIG. 3 is a schematic diagram illustrating a host system and a memory storage device according to another exemplary embodiment.

In an exemplary embodiment, the aforementioned host system may be any system capable of substantially cooperating with the memory storage device for storing data. Although the host system is illustrated as a computer system in the foregoing exemplary embodiment. However, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, while a memory storage device 30 may be various non-volatile memory storage devices used by the host system 31, such as a SD card 32, a CF card 33 or an embedded storage device 34. The embedded storage device 34 may include an embedded MMC (eMMC) 341 and/or an embedded multi chip package (eMCP) 342, in which a memory module is directly connected to a substrate of the host system.

Figure 4:
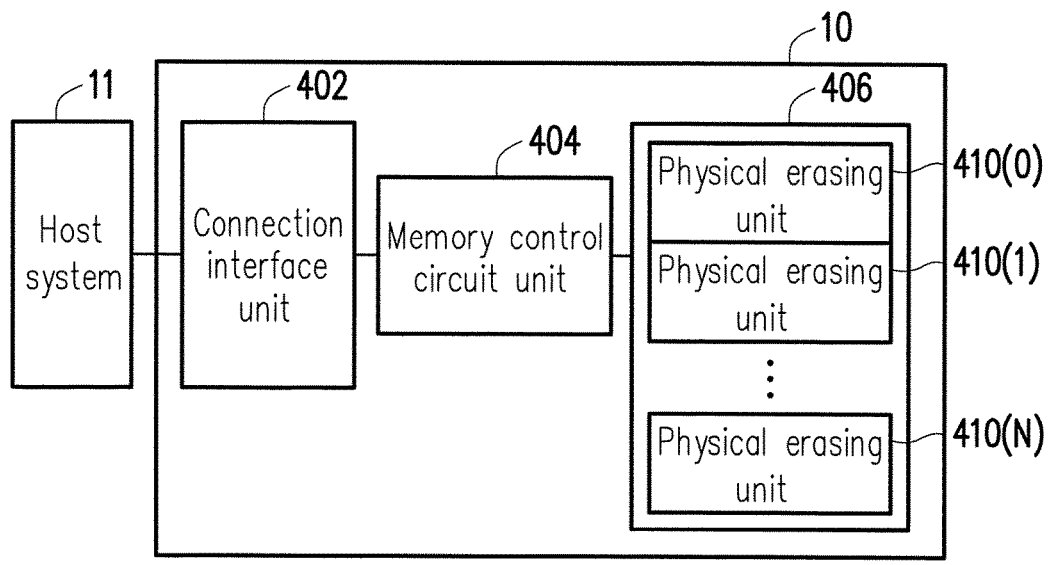
FIG. 4 is a schematic block diagram illustrating the host system and the memory storage device according to an exemplary embodiment.

FIG. 4 is a schematic block diagram illustrating the host system and the memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, connection interface unit 402 the connection interface unit 402 is compatible with a serial advanced technology attachment (SATA) standard. However, it should be understood that the disclosure is not limited thereto, and the connection interface unit 402 may also be compatible with a secure digital (SD) interface standard, a parallel advanced technology attachment (PATA) standard, an institute of electrical and electronic engineers (IEEE) 1394 standard, a peripheral component interconnect express (PCI Express) standard, a universal serial bus (USB) standard, an ultra high speed-I (UHS-I) interface standard, an ultra high speed-II (UHS-II) interface standard, a memory stick (MS) interface standard, a multi-chip package interface standard, a multi media card (MMC) interface standard, an embedded multimedia card (eMMC) interface standard, a universal flash storage (UFS) interface standard, an embedded multi chip package (eMCP) interface standard, a compact flash (CF) interface standard, an integrated device electronics (IDE) standard or other suitable standards. In the present exemplary embodiment, the connection interface unit 402 may be packaged with the memory control circuit unit 404 in one chip or laid outside a chip including the memory control circuit unit 404.

The memory control circuit unit 404 is configured to execute a plurality of logic gates or control commands which are implemented in a form of hardware or firmware and perform operations such as data writing, data reading and data erasing in the rewritable non-volatile memory module 406 according to commands issued by the host system 11.

The rewritable non-volatile memory module 406 is connected to the memory control circuit unit 404 and configured to store data written from the host system 11. The rewritable non-volatile memory module 406 includes physical erasing units 410(0) to 410(N). For example, the physical erasing units 410(0) to 410(N) may belong to the same memory die or different memory dies. Each of the physical erasing units includes multiple physical programming units, and the physical programming units belonging to the same physical erasing unit may be written separately but erased altogether synchronously. However, it should be understood that the disclosure is not limited thereto, and each of the physical erasing units may be composed of 64 physical programming units, 256 physical programming units or any other number of physical programming units.

To be more detailed, a physical erasing unit is the smallest unit for erasing. Namely, each of the physical erasing units has the least number of memory cells to be erased altogether. A physical programming unit is the smallest unit for programming. Namely, the physical programming unit is the smallest unit for writing data. The physical programming units generally include a data bit area and a redundant bit area. The data bit area includes a plurality of physical access addresses configured to store user data, and the redundant bit area is configured to store system data (e.g., control information and error correcting codes). In the present exemplary embodiment, the data bit area of each physical programming unit contains 8 physical access addresses, and a size of each physical access address is 512 bytes. However, in other exemplary embodiments, the data bit area may contain more or less number of physical access addresses, and the number and the size of the physical access addresses are not limited in the disclosure. For example, in an exemplary embodiment, the physical erasing units are physical blocks, and the physical programming units are physical pages or physical sectors, which are not limited in the disclosure.

In the present exemplary embodiment, the rewritable non-volatile memory module 406 is a trinary level cell (TLC) NAND flash memory module (i.e., a flash memory module capable of storing 3 data bits in one memory cell). However, the disclosure is not limited thereto, and the rewritable non-volatile memory module 406 may also be a single level cell (SLC) NAND flash memory module (i.e., a flash memory module capable of storing 1 data bit in one memory cell), a multi level cell (MLC) NAND flash memory module (i.e., a flash memory module capable of storing 2 data bits in one memory cell) or any other memory module with the same characteristics.

Figure 5:
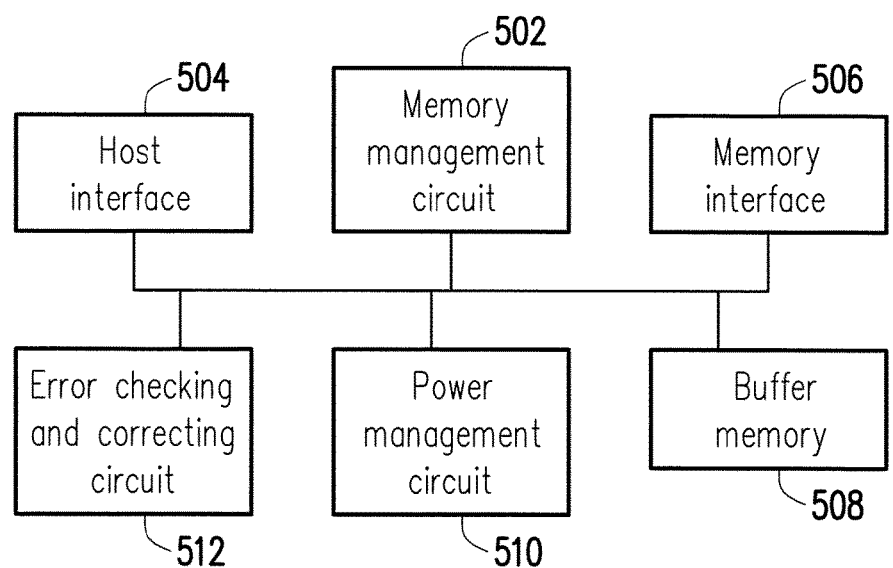
FIG. 5 is a schematic block diagram illustrating the memory control circuit unit according to an exemplary embodiment.

FIG. 5 is a schematic block diagram illustrating the memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands, and when the memory storage device 10 is operated, the control commands are executed to perform operations such as data writing, data reading and data erasing.

In the present exemplary embodiment, the control commands of the memory management circuit 502 are implemented in a form of firmware. For example, the memory management circuit 502 has a microprocessor unit (not shown) and a read-only memory (ROM, not shown), and the control commands are burnt into the ROM. When the memory storage device 10 is operated, the control commands are executed by the microprocessor unit to perform operations, such as data writing, data reading and data erasing.

In another exemplary embodiment of the disclosure, the control commands of the memory management circuit 502 may also be stored as program codes in a specific area (for example, a system area in a memory module exclusively used for storing system data) of the rewritable non-volatile memory module 406. In addition, the memory management circuit 502 has a microprocessor unit (not shown), an ROM (not shown) and an RAM (not shown). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as data writing, data reading and data erasing.

Additionally, in another exemplary embodiment of the disclosure, the control commands of the memory management circuit 502 may also be implemented in a form of hardware. For example, the memory management circuit 502 includes a micro-controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are connected to the micro-controller. The memory cell management circuit is configured to manage the physical erasing units of the rewritable non-volatile memory module 406, the memory writing circuit is configured to issue a write command to the rewritable non-volatile memory module 406 to write data into the rewritable non-volatile memory module 406, the memory reading circuit is configured to issue a read command to the rewritable non-volatile memory module 406 to read data from the rewritable non-volatile memory module 406, the memory erasing circuit is configured to issue an erase command to the rewritable non-volatile memory module 406 to erase data from the rewritable non-volatile memory module 406, and the data processing circuit is configured to process data to be written into the rewritable non-volatile memory module 406 or data read from the rewritable non-volatile memory module 406.

The host interface 504 is connected to the memory management circuit 502 and configured to be connected to the connection interface unit 402 to receive and identify commands and data transmitted by the host system 11. That is, the commands and the data transmitted by the host system 11 are transmitted to the memory management circuit 502 through the host interface 504. In the present exemplary embodiment, the host interface 504 is compliable with the SATA standard. However, it should be understood that the disclosure is not limited thereto, and the host interface 504 may also be compliable with the PATA standard, the IEEE 1394 standard, the PCI Express standard, the USB standard, the UHS-I interface standard, the UHS-II interface standard, the SD standard, the MS standard, the MMC standard, the CF standard, the IDE standard or other suitable data transmission standards.

The memory interface 506 is connected to the memory management circuit 502 and configured to access the rewritable non-volatile memory module 406. That is, data to be written into the rewritable non-volatile memory module 406 is converted into a format acceptable by the rewritable non-volatile memory module 406 through the memory interface 506.

In an exemplary embodiment, the memory control circuit unit 404 further includes a buffer memory 508, a power management circuit 510 and an error checking and correcting circuit 512.

The buffer memory 508 is connected to the memory management circuit 502 and configured to temporarily store data and commands from the host system 11 or data from the rewritable non-volatile memory module 406.

The power management circuit 510 is connected to the memory management circuit 502 and configured to control the power of the memory storage device 10.

The error checking and correcting circuit 512 is connected to the memory management circuit 502 and configured to execute an error checking and correcting procedure to ensure data accuracy. To be specific, when the memory management circuit 502 receives a write command from the host system 11, the error checking and correcting circuit 512 generates a corresponding error checking and correcting (ECC) code for data corresponding to the write command, and the memory management circuit 502 writes the data corresponding to the write command and the corresponding ECC code into the rewritable non-volatile memory module 406. Thereafter, when reading the data from the rewritable non-volatile memory module 406, the memory management circuit 502 reads the ECC code corresponding to the data, and the error checking and correcting circuit 512 performs the error checking and correcting procedure on the read data according to the ECC code.

In the present exemplary embodiment, the error checking and correcting circuit 512 is implemented by using a low density parity code (LDPC). However, in another exemplary embodiment, the error checking and correcting circuit 512 may also be implemented by using other encoding/decoding algorithms, such as a BCH code, a convolutional code, a turbo code, bit flipping.

To be specific, the memory management circuit 502 generates an error checking and correcting frame (which is also referred to as an ECC frame) according to received data and a corresponding ECC code and writes the ECC frame into the rewritable non-volatile memory module 406. Then, when the memory management circuit 502 reads the data from the rewritable non-volatile memory module 406, the error or checking and correcting circuit 512 verifies accuracy of the data according to ECC code in the ECC frame.

In descriptions hereinafter, operations performed by the memory management circuit 502, the host interface 504, the memory interface 506, the buffer memory 508, the power management circuit 510 and the error checking and correcting circuit 512 may also referred to as operations performed by the memory control circuit unit 404.

Figure 6:
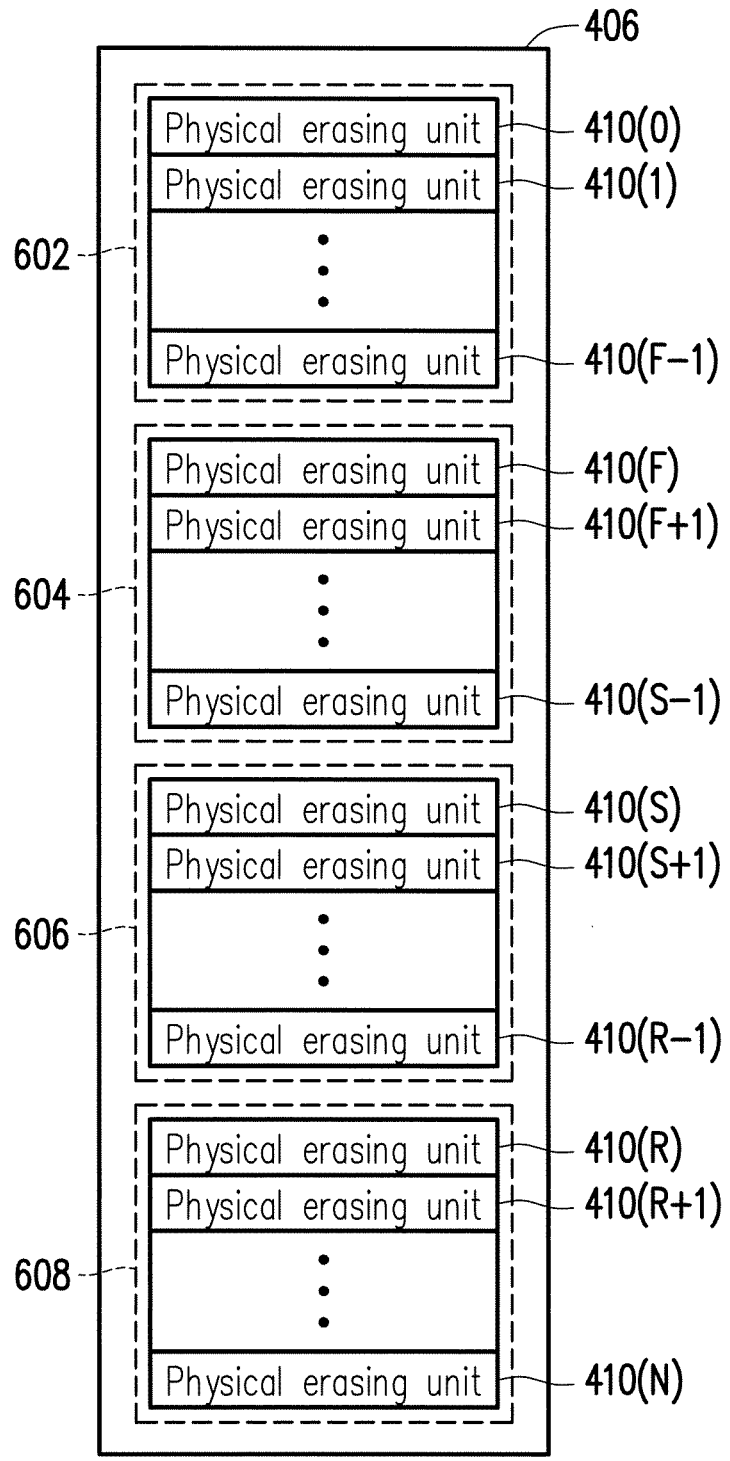
FIG. 6 and FIG. 7 are schematic diagrams illustrating the management of the physical erasing units according to an exemplary embodiment.
Figure 7:
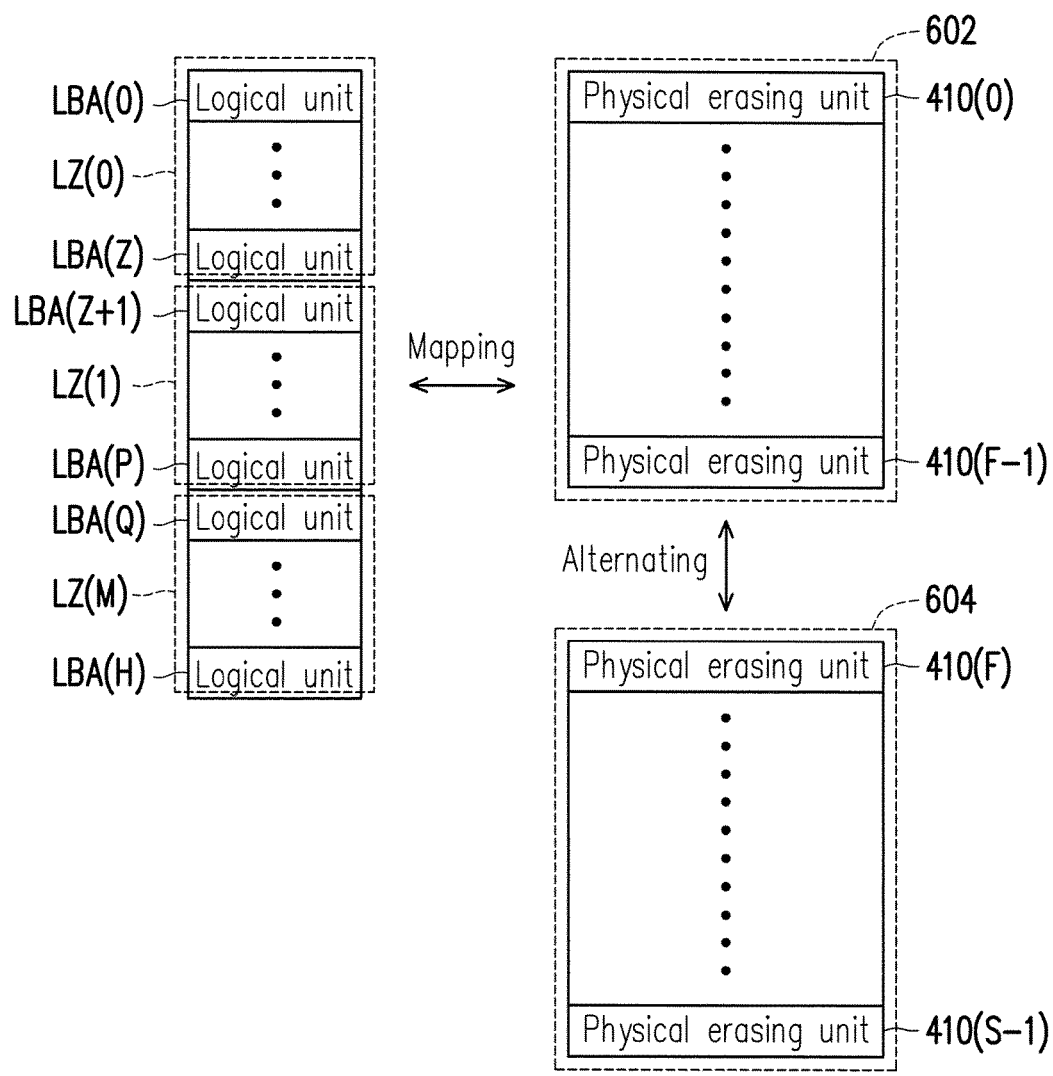

FIG. 6 and FIG. 7 are schematic diagrams illustrating the management of the physical erasing units according to an exemplary embodiment.

It should be understood that terms, such as "select", "group", "divide", "associate" and so forth, are logical concepts which describe operations in the physical erasing units of the rewritable non-volatile memory module 406. That is, the physical erasing units of the rewritable non-volatile memory module 406 are logically operated, but actual positions of the physical erasing units of the rewritable non-volatile memory module are not changed.

The memory management circuit 502 logically groups the physical erasing units 410(0) to 410(N) into a data area 602, a spare area 604, a system area 606 and a replacement area 608.

The physical erasing units logically belonging to the data area 602 and the spare area 604 are configured to store data from the host system 11. Specifically, the physical erasing units of the data area 602 are regarded as the physical erasing units that already store data, whereas the physical erasing units of the spare area 604 are configured to substitute the physical erasing units of the data area 602. In other words, when a write command and data to be written are received from the host system 11, the memory management circuit 502 selects a physical erasing unit from the spare area 604, and writes the data into the selected physical erasing unit to replace the physical erasing units in the data area 602.

The physical erasing units logically belonging to the system area 606 are configured to record system data. For example, the system data includes information related to the manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. Specifically, if there are still available physical erasing units in the replacement area 608, and a physical erasing unit in the data area 602 is damaged, the memory management circuit 502 selects an available physical erasing unit from the replacement area 608 for substituting the damaged physical erasing unit.

Particularly, the numbers of the physical erasing units in the data area 602, the spare area 604, the system area 606 and the replacement area 608 may be different according to the different memory specifications. In addition, it should be understood that during the operation of the memory storage device 10, grouping relations of the physical erasing units associated with the data area 602, the spare area 604, the system area 606 and the replacement area 608 may be dynamically changed. For example, when a physical erasing unit in the spare area 604 is damaged and replaced by a physical erasing unit from the replacement area 608, the physical erasing unit originally in the replacement area 608 is associated with the spare area 604.

Referring to FIG. 7, the memory management circuit 502 may configure logical units LBA(0) to LBA(H) for mapping to the physical erasing units in the data area 602, and each of the logical units has a plurality of logical sub-units for mapping to the corresponding physical programming units of the physical erasing units. Further, when the host system 11 attempts to write data into the logical units or update data stored in the logical units, the memory management circuit 502 selects a physical erasing unit from the spare area 604 to write the data as an alternate exchange with the physical erasing unit in the data area 602. In the present exemplary embodiment, the logical sub-units may be logic pages or logic sectors.

In order to identify the physical erasing unit in which the data of each logical unit is stored, in the present exemplary embodiment, the memory management circuit 502 records the mapping relations between the logical units and the physical erasing units. Further, when the host system 11 attempts to access data in a logical sub-unit, the memory management circuit 502 may confirm a logical unit which the logical sub-unit belongs to and access the data in a physical erasing unit mapped to the logical unit. For example, in the present exemplary embodiment, the memory management circuit 502 may store a logical-physical mapping table in the rewritable non-volatile memory module 406 to record the physical erasing unit mapped to each of the logical units, and the logical-physical mapping table may be loaded to the buffer memory 508 for maintenance when the memory management circuit 502 attempts to the access the data.

It should be noted that due to limited capacity, the buffer memory 508 may not store the mapping tables recording the mapping relations of all logical units. Therefore, in the present exemplary embodiment, the memory management circuit 502 groups the logical units LBA(0) to LBA(H) into a plurality of logical zones LZ(0) to LZ(M), and allocates a logical-physical mapping table to each logical zone. Particularly, when the memory management circuit 502 attempts to update the mapping of a specific logical unit, the logical-physical mapping table corresponding to a logical zone which the logical unit belongs to is loaded to the buffer memory 508 and updated.

In the present exemplary embodiment, the memory management circuit 502 may program data into the physical erasing units by using a single-page programming mode or a multi-page programming mode. The single-page programming mode refers to a writing mode that a memory cell stores only one data bit. The single-page programming mode may be, for example, one of a single layer memory cell (SLC) programming mode, a lower physical programming mode, a mixture programming mode and a less layer memory cell programming mode. To be more detailed, in the SLC mode, one memory cell stores data of only one bit. In the lower physical programming mode, only a lower physical programming unit is programmed, while an upper physical programming unit corresponding to the lower physical programming unit may not be programmed. In the mixture programming mode, valid data (or, true data) is programmed into a lower physical programming unit, while dummy data is programmed to an upper physical programming unit corresponding to the lower physical programming unit storing the valid data. In the less layer memory cell programming mode, a memory cell stores data of a first number of bits. For example, the first number may be set to "1". The multi-page programming mode refers to a writing mode that one memory cell stores a plurality of data bits. The multi-page programming mode may be, for example, a multi level memory cell (MLC) programming mode, a trinary level memory cell (TLC) programming mode or the like. In the multi-page programming mode, a memory cell stores data of a second number of bits, where the second is greater than or equal to "2". For example, the second may be set to 2 or 3.

Namely, in the single-page programming mode, memory cells on a word line provides a storage capacity of only one physical programming unit for storing data, while in the multi-page programming mode, memory cells on a word line provides a storage capacity of multiple physical programming units for storing data. Thus, a data capacity of a physical erasing unit programmed based on the multi-page programming mode is greater than a data capacity of a physical erasing unit programmed based on the single-page programming mode. In an exemplary embodiment, the data capacity of a physical erasing unit programmed based on the multi-page programming mode is also referred to as a predetermined capacity of a physical erasing unit. Moreover, a programming speed of programming the memory cells based on the single-page programming mode is higher than a programming speed of programming the memory cells based on the multi-page programming mode (i.e., an operation time required for programming data by using the multi-page programming mode is more than an operation time required for programming data by using the single-page programming mode), and reliability of data stored based on the single-page programming mode is usually higher than reliability of data stored based on the multi-page programming mode.

It is noted that in the following description, some terms may be replaced with corresponding abbreviations for ease of reading (see Table 1).

TABLE 1

| rewritable non-volatile memory module | RNVM module |
|---|---|
| physical erasing unit | PEU |
| physical programming unit | PPU |
| memory management circuit | MMC |

Figure 8:
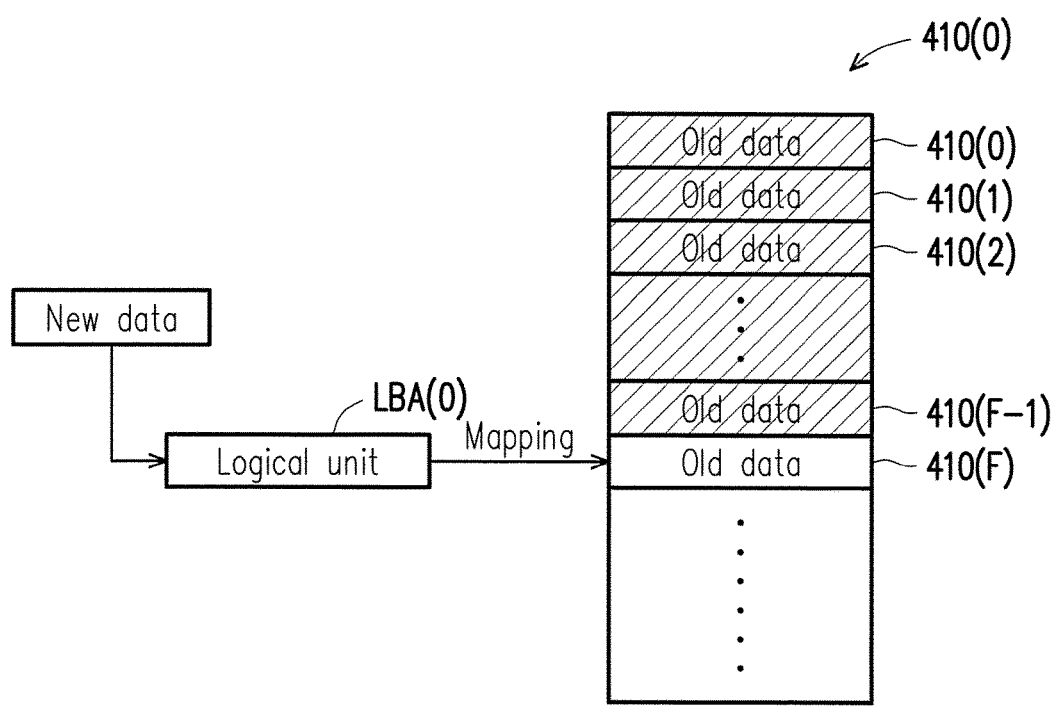
FIG. 8 is a schematic diagram illustrating data updating according to an exemplary embodiment.

FIG. 8 is a schematic diagram illustrating data updating according to an exemplary embodiment.

Referring to FIG. 7 and FIG. 8, as described above, the PEUs of the data area 602 and the spare area 604 in the RNVM module 406 alternately store the data from the host system 11. For example, when receiving a write command which instructs to write data into the logical unit LBA(0) from the host system 11, the MMC 502 selects the PEU 410(0) from the spare area 604, programs data belonging to the logical unit LBA(0) into PEU 410(0), and associates the PEU 410(0) with the data area 602. Thereafter, in the condition that the data belonging to the logical unit LBA(0) is programmed into the PEU 410(0), if another write command from the host system 11 instructs to write new data into the logical unit LBA(0), the new data belonging to the logical unit LBA(0) is programmed into another PEU 410 (1), and the data stored in the PEU 410(0) is regarded as old data and marked as invalid. If the host system 11 continuously sends write commands instructing to write new data into the logical unit LBA(0), the new data belonging to the logical unit LBA(0) is continuously programmed into the PEUs 410(2) to 410(F-1), and old data belonging to the logical unit LBA(0) which is stored in the PEUs 410(0) to 410(F-2) are all marked as invalid. After the aforementioned operation has been performed for a period of time, the new data belonging to the logical unit LBA(0) is programmed into the PEU 410(F), and the old data belonging to the logical unit LBA(0) stored in the PEUs 410(0) to 410(F-1) are all marked as invalid (referring to the part marked by slash lines). In this circumstance, although the PEUs 410(0) to 410(F) are the PEUs that store data (or referred to as used PEUs), only the new data stored in the PEU 410(F) is valid data. Namely, although the PEUs 410(0) to 410(F) all store data, actually, a data amount of the valid data (or referred to as a valid data amount) stored in the PEUs 410(0) to 410(F) is only equivalent to a data capacity of a PEU. In other words, in the aforementioned situation, after the writing operation has been performed according to the commands from the host system 11 for several times, the corresponding valid data amount may not be increased even though a number of the PEUs that store data is continuously increased.

In the present exemplary embodiment, when a number of the PEUs that already store data (which are also referred to as first PEUs hereinafter) is greater than a specific value, the MMC 502 performs a garbage collection operation to reorganize the valid data in the data area 602, thereby re-associating the PEUs in the data area 602 that store no valid data with the spare area 604. In an exemplary embodiment, the valid data amount may be a total data amount of the valid data stored in the PEUs of the data area 602, and the first PEUs may be the PEUs belonging to the data area 602. In an exemplary embodiment, the valid data amount may be the total data amount of the valid data stored in the first PEUs. The MMC 502 obtains a valid data parameter corresponding to the valid data amount, and obtains a threshold value (which is also referred to as a first threshold value hereinafter) corresponding to the aforementioned specific value based on the valid data parameter.

To be more detailed, the MMC 502 may divide the valid data amount by a predetermined capacity of one PEU to obtain a valid number corresponding to the valid data amount and obtains the valid data parameter based on the valid number. For example, the valid data parameter may be positively correlated to the total data amount of the valid data stored in the first PEUs. In addition, the MMC 502 also obtains a parameter (which is also referred to as a calculation parameter hereinafter) corresponding to the number of all the PEUs. Then, the MMC 502 may obtain the first threshold value based on the calculation parameter and the valid data parameter. For example, the MMC 502 may subtract the calculation parameter by the valid data parameter to obtain a difference value (which is also referred to as a first difference value hereinafter) and subtract the first difference value by a predetermined parameter (which is also referred to as a first predetermined parameter hereinafter) to obtain the first threshold value. The first predetermined parameter may be set based on the number of the PEUs used for management of the RNVM module 406. In another exemplary embodiment, the MMC 502 may also employs the first difference value as the first threshold value.

Furthermore, the MMC 502 obtains a number of the first PEUs (which is also the number of the PEUs that store data) and obtains a parameter (which is also referred to as a first determination parameter hereinafter) based on the number of the first PEUs. In other words, the first determination parameter corresponds to the number of the PEUs that already store data. Then, the MMC 502 determines whether the first determination parameter is greater than the first threshold value. If the first determination parameter is greater than the first threshold value, the MMC 502 performs the garbage collection operation.

The MMC 502 may select at least one PEU from the first PEUs for performing the garbage collection operation. The MMC 502 copies valid data of the at least one PEU to another PEU selected from the spare area 604. For example, the MMC 502 may store the copied valid data into the selected PEU by using the single-page programming mode or the multi-page programming mode. Then, the MMC 502 performs an erasing operation on the at least one PEU to change the least one PEU as the PEU not storing data, and the erased PEU is associated with the spare area 604. Through the garbage collection operation, the number of the PEU that store data (i.e., the first PEUs) is decreased (and/or the number of the PEUs belonging to the spare area 6014 is increased), and the first determination parameter is changed. For example, if the value of the first determination parameter is positively correlated to the total number of the first PEUs, the value of the first determination parameter is decreased as the number of the first PEUs is decreased. The MMC 502 may continue to determine whether the first determination parameter is greater than the first threshold value. If the first determination parameter is less than or equal to the first threshold value, the MMC 502 may end the garbage collection operation.

In a case that the RNVM module 406 is a TLC NAND flash memory module, the MMC 502 may program data into one or more PEUs by using the single-page programming mode or the multi-page programming mode. In an exemplary embodiment, the MMC 502 may initially set a PEU to be programmed based on the single-page programming mode. Namely, when receiving the write command from the host system 11, the MMC 502 selects a PEU from the spare area 604 and programs data (i.e., write data) corresponding to the write command into the PPUs in the PEU by using the single-page programming mode. Thereafter, if the PEU is fully written (i.e., all the PPUs in the PEU have stored data), the MMC 502 associates the PEU to the data area 602 and selects another PEU from the spare area 604 for programming data. In the present exemplary embodiment, the first PEUs (i.e., the PEUs that store data) may be the PEUs in the data area 602 which are programmed by using the single-page programming mode.

The PEUs belonging to the spare area 604 may be considered as the PEUs that store no data or as spare PEUs (which are also referred to as second PEUs hereinafter). As the number of times of the write operations is increased, a number of the second PEUs is correspondingly decreased. In the present exemplary embodiment, if the number of the second PEUs is less than another specific value, the MMC 502 sets the rests of the PEUs in the spare area 604 to be programmed based on the multi-page programming mode. To be more detailed, the MMC 502 may obtain another threshold value (which is also referred to as a second threshold value hereinafter) corresponding to this specific value based on the valid data amount. For example, the MMC 502 may subtract the first difference value, which is obtained based on the calculation parameter and the valid data parameter, by another predetermined parameter (which is also referred to as a second predetermined parameter hereinafter), thereby calculating the second threshold value. The second predetermined parameter may also be set based on the number of the PEUs planned to be used in management of the RNVM module 406, and the second predetermined parameter may be different from the first predetermined parameter. For example, the second threshold value may be less than the first threshold value. Namely, a predetermined difference value exists between the first threshold value and the second threshold value. Thus, in another exemplary embodiment, the MMC 502 may also subtract the first threshold value by the predetermined difference value to obtain the second threshold value. The predetermined difference value may be a value corresponding to 15 to 20 PEUs. For example, the predetermined difference value may be 15.

Afterwards, the MMC 502 obtains a parameter (which is also referred to as a second determination parameter hereinafter) corresponding to the number of the PEUs that store no data (which are the second PEUs) and determines whether the second determination parameter is less than the second threshold value. For example, the number of the second PEUs may be a total number of the PEUs belonging to the spare area 604, and the second determination parameter may be positively correlated to the number of the second PEUs. If the second determination parameter is less than the second threshold value, the MMC 502 sets the rest of the PEUs in the spare area 604 to be programmed based on the multi-page programming mode. After the PEUs are set to be programmed based on the multi-page programming mode, the MMC 502, when receiving the write command from the host system 11, selects a PEU from the spare area 604 and programs data (i.e., write data) corresponding to the write command into the selected PEU by using the multi-page programming mode. In other words, the selected PEU is one of the second PEUs. The MMC 502 may continue to determine whether the second determination parameter is less than the second threshold value. If the second determination parameter is not less than the second threshold value, the MMC 502 performs the programming operation on the PEUs by using the single-page programming mode.

In another exemplary embodiment, the MMC 502 may also determine whether to perform the programming operation on the PEUs by using the single-page programming mode or by using the multi-page programming mode based on the valid data parameter corresponding to the valid data amount and the second threshold value. If the valid data parameter is less than the second threshold value, the MMC 502 performs the programming operation on the rest of the PEUs in the spare area 604 by using the multi-page programming mode. In other words, the MMC 502 may perform the subsequent programming operation on the PEUs by using the multi-page programming mode if the second determination parameter is less than the second threshold value, or the valid data parameter is less than the second threshold value. In addition, the MMC 502 may perform the subsequent programming operation on the PEUs by using the single-page programming mode if the second determination parameter is not less than the second threshold value, and the valid data parameter is not less than the second threshold value.

In an exemplary embodiment, each of the parameters described above may be represented by the number of the related PEUs. For example, the MMC 502 may divide the valid data amount by a predetermined capacity of PEUs to calculate the valid number and employ the valid number as the valid data parameter. The valid number may be used to represent that the valid data amount is equivalent to a total capacity of a specific number of PEUs, where each of the PEUs has the predetermined capacity. The calculation parameter may be the number of all the PEUs (for example, the calculation parameter may be a total number of all the PEUs in the data area 602 and the spare area 604). The first predetermined parameter and the second predetermined parameter may respectively refer to the numbers of the PEUs to be used in management, and the first predetermined parameter and the second predetermined parameter may be the same or different, which depends on actual demand. The first determination parameter may be the number of the PEU that store data, and the second determination parameter may be the number of the PEUs that store no data. For example, the number of all the PEUs may be 100, and the calculation parameter may be 100. If it is assumed that the valid number is 50, it represents that the valid data amount is equivalent to the sum of the predetermined capacity of 50 PEUs. If the first predetermined parameter is 10, the first threshold value may be 40. If the predetermined difference value is 15 (i.e., the second predetermined parameter is 25), the second threshold value may be 25.

In another exemplary embodiment, each of the parameters described above may also be represented by a ratio corresponding to the number of the related PEUs. Each of the aforementioned corresponding ratios may be a percentage or a value ranging from 0 to 1. For example, the valid data parameter may be a ratio obtained by dividing the valid number by the number of all the PEUs. The calculation parameter may be a ratio corresponding to the number of all the PEUs. That is, the calculation parameter may be 100% or 1. The first predetermined parameter or the second predetermined parameter may be a ratio obtained by dividing the number of the PEU to be used in management by the number of all the PEUs. The first determination parameter may be a ratio obtained by dividing the number of the PEU that store data by the number of all the PEUs. The second determination parameter may be a ratio obtained by dividing the number of the PEUs that store no data by the number of all the PEUs. For example, the calculation parameter corresponding to the number of all the PEUs is 100%. If it is assumed that the valid number is 50%, it represents that the valid number is 50% of the number of all the PEUs. If the first predetermined parameter is 10%, the first threshold value may be 40%. If the second predetermined parameter is 25%, the second threshold value may be 25%.

Figure 9:
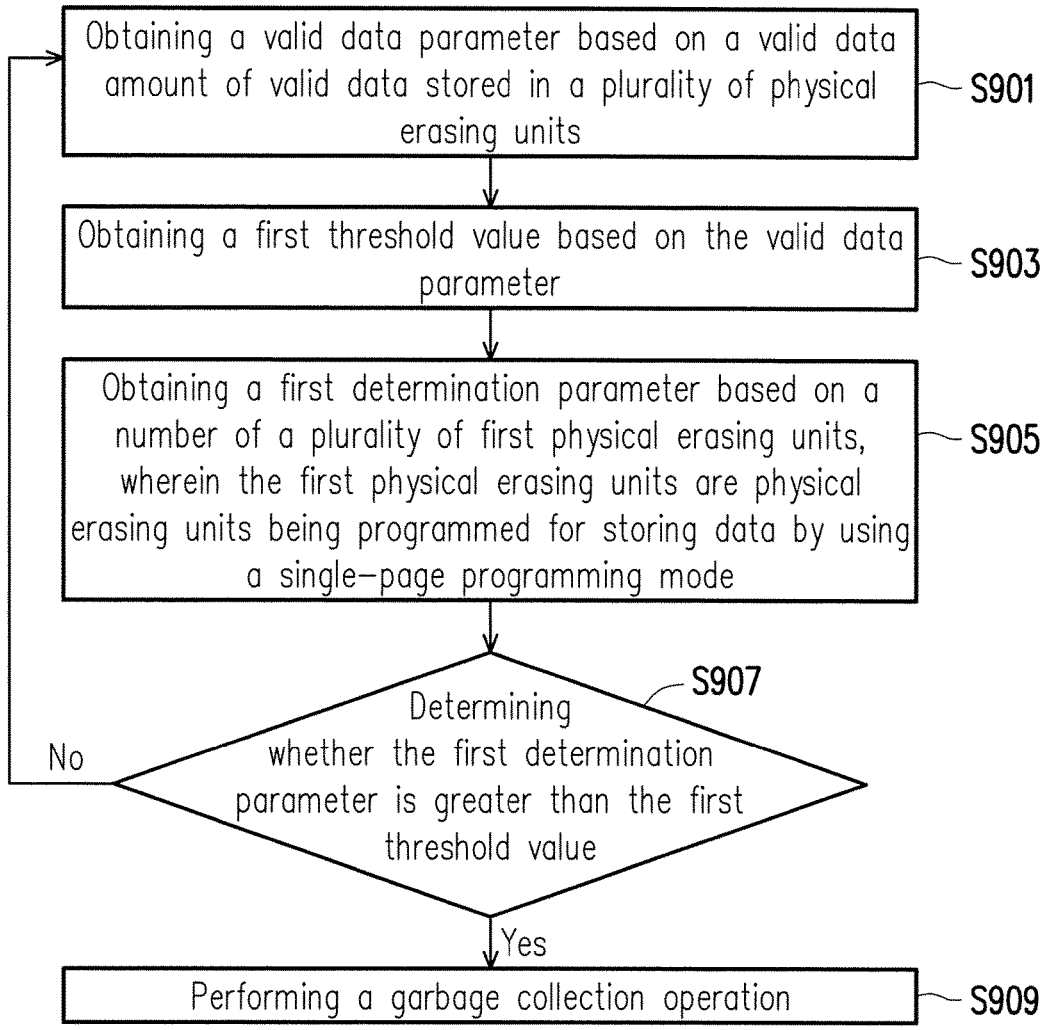
FIG. 9 is a flowchart illustrating a memory management method according to an exemplary embodiment.

FIG. 9 is a flowchart illustrating a memory management method according to an exemplary embodiment.

Referring to FIG. 9, in step S901, the MMC 502 obtains a valid data parameter based on a valid data amount of the valid data stored in a plurality of PEUs. The aforementioned PEUs may be the PEUs belonging to the data area 602. Specifically, the MMC 502 calculates a valid number based on the valid data amount and a data capacity of one PEU, thereby obtaining the corresponding valid data parameter based on the valid number.

In step S903, the MMC 502 obtains a first threshold value based on the valid data parameter. In this step, the MMC 502 may further obtain a calculation parameter corresponding to a number of all the PEUs and calculates a difference value based on the calculation parameter, the valid data parameter and a first predetermined parameter to obtain a first threshold value. In step S905, the MMC 502 obtains a first determination parameter based on a number of a plurality of first PEUs, wherein the first PEUs are the PEUs being programmed for storing data by using a single-page programming mode.

Then, in step S907, the MMC 502 determines whether the first determination parameter is greater than the first threshold value. If the first determination parameter is not greater than the first threshold value, the MMC 502 may repeatedly perform the steps S901 to S907 to continuously update the first threshold value and the first determination parameter and determine whether the first determination parameter is greater than the first threshold value. On the other hand, if the first determination parameter is greater than the first threshold value, in step S909, the MMC 502 performs a garbage collection operation.

Figure 10:
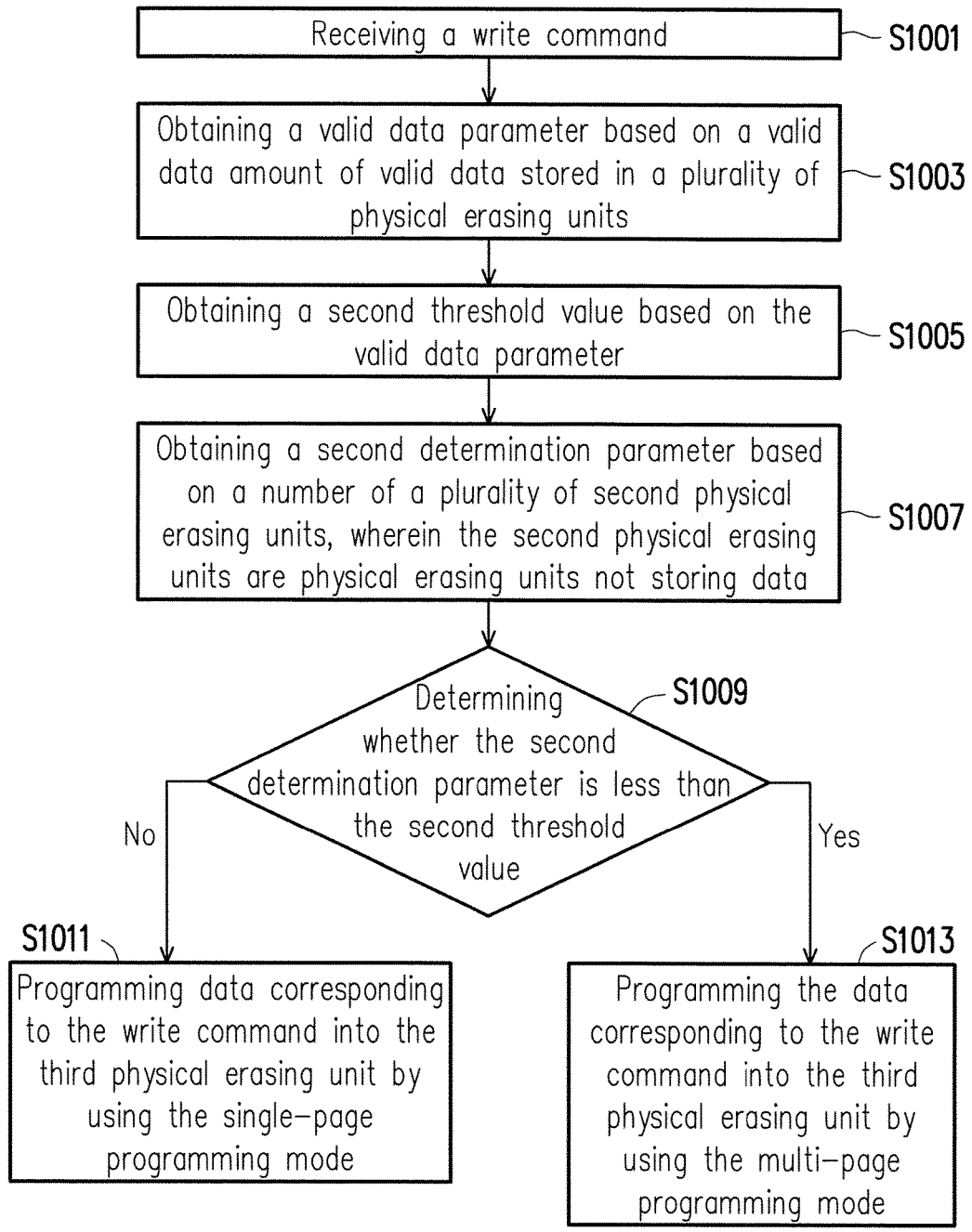
FIG. 10 is a flowchart illustrating a memory management method according to another exemplary embodiment.

FIG. 10 is a flowchart illustrating a memory management method according to another exemplary embodiment. In the exemplary embodiment illustrated in FIG. 10, the PEUs may be initially set to be programmed based on the single-page programming mode.

Referring to FIG. 10, in step S1001, the MMC 502 receives a write command from the host system 11. In step S1003, the MMC 502 obtains a valid data parameter based on a valid data amount of valid data stored in a plurality of PEUs.

In step S1005, the MMC 502 obtains a second threshold value based on the valid data parameter. In this step, the MMC 502 may also obtains a calculation parameter corresponding to the number of all the PEUs and calculates a difference value based on the calculation parameter, the valid data parameter and a second predetermined parameter, thereby obtaining the second threshold value. A predetermined difference value may exist between the second threshold value and the first threshold value illustrated in FIG. 9.

In step S1007, the MMC 502 obtains the second determination parameter based on a number of second PEUs, wherein the second PEUs are the PEUs that store no data (i.e., the PEUs not storing data). Alternatively, the second PEUs are the PEUs belonging to the spare area 604.

Thereafter, in step S1009, the MMC 502 determines whether the second determination parameter is less than the second threshold value. If the second determination parameter is not less than the second threshold value, in step S1011, the MMC 502 programs data corresponding to the write command into a third PEU by using the single-page programming mode. If the second determination parameter is less than the second threshold value, in step S1013, the MMC 502 programs the data corresponding to the write command into the third PEU by using a multi-page programming mode. The third PEU may be one of the second PEUs.

Each step illustrated in FIG. 9 and FIG. 10 has been described in detail in the exemplary embodiments above and will not be repeated hereinafter. In addition, the MMC 502 may perform each step illustrated in FIG. 9 and FIG. 10 in different execution modes. For example, the MMC 502 may perform each step illustrated in FIG. 9 in a background execution mode and perform each step illustrated in FIG. 10 in an operation mode.

In light of the foregoing, the memory management method of the disclosure can obtain the threshold value for determining whether to perform the garbage collection operation based on the valid data amount, and thereby, the threshold value can be dynamically adjusted along with the change of the valid data amount. Accordingly, the start time of the garbage collection operation can be delayed, thereby preventing the garbage collection operation from being frequently performed due to the threshold value being a fixed value. In addition, the memory management method of the disclosure can also obtain the threshold value for determining whether to change the programming mode of the PEUs based on the valid data amount. In this way, the overall operation performance can be enhanced.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A memory management method for a rewritable nonvolatile memory module having a plurality of physical erasing units, the memory management method comprising:
  receiving a write command from a host system;
  obtaining a valid data parameter based on a valid data amount of valid data stored in at least a part of the physical erasing units;
  obtaining a first threshold value and a second threshold value based on the valid data parameter;
  obtaining a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit;

performing a garbage collection operation if the first determination parameter is greater than the first threshold value;

obtaining a second determination parameter based on a number of a plurality of second physical erasing units among the physical erasing units, wherein the second physical erasing units are not to be stored data; and if the second determination parameter is less than the second threshold value, programming data corresponding to the write command into a third physical erasing unit among the second physical erasing units by using a multi-page programming mode, wherein each memory cell of a physical erasing unit programmed by using the multi-page programming mode stores a plurality of data bits.

2. The memory management method according to claim 1, wherein the step of obtaining the valid data parameter based on the valid data amount of the valid data stored in the at least a part of the physical erasing units comprises:

dividing the valid data amount by a predetermined capacity to calculate a valid number corresponding to the valid data to obtain the valid data parameter.

3. The memory management method according to claim 2, wherein the predetermined capacity is a data capacity of a physical erasing unit programmed by using a multi-page programming mode, and each memory cell of a physical erasing unit programmed by using the multi-page programming mode stores a plurality of data bits.

4. The memory management method according to claim 1, wherein the step of obtaining the first threshold value based on the valid data parameter comprises:

subtracting a calculation parameter by the valid data parameter and a first predetermined parameter to obtain the first threshold value, wherein the calculation parameter corresponds to a number of the physical erasing units.

5. The memory management method according to claim 1, wherein the step of performing the garbage collection operation is performed in a background execution mode.

6. The memory management method according to claim 1, further comprising:

if the valid data parameter is less than the second threshold value, programming the data corresponding to the write command into the third physical erasing unit by using the multi-page programming mode.

7. The memory management method according to claim 6, further comprising:

if the second determination parameter is not less than the second threshold value and the valid data parameter is not less than the second threshold value, programming the data corresponding to the write command into the third physical erasing unit by using the single-page programming mode.

8. The memory management method according to claim 1, wherein the second threshold value is less than the first threshold value, and a difference value between the first threshold value and the second threshold value is equal to a predetermined difference value.

9. The memory management method according to claim 1, wherein the step of obtaining the second threshold value based on the valid data parameter comprises:

subtracting a calculation parameter by the valid data parameter and a second predetermined parameter to obtain the second threshold value, wherein the calculation parameter corresponds to a number of the physical erasing units.

10. A memory control circuit unit, configured to control a rewritable non-volatile memory module, wherein the memory control circuit unit comprises:

a host interface, configured to be connected to a host system;

a memory interface, configured to be connected to the rewritable non-volatile memory module having a plurality of physical erasing units; and a memory management circuit, connected to the host interface and the memory interface, wherein the memory management circuit is configured to receive a write command from the host system, wherein the memory management circuit is further configured to obtain a valid data parameter based on a valid data amount of valid data stored in at least a part of the physical erasing units, wherein the memory management circuit is further configured to obtain a first threshold value and a second threshold value based on the valid data parameter, wherein the memory management circuit is further configured to obtain a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit, wherein the memory management circuit is further configured to perform a garbage collection operation if the first determination parameter is greater than the first threshold value, wherein the memory management circuit is further configured to obtain a second determination parameter based on a number of a plurality of second physical erasing units among the physical erasing units, wherein the second physical erasing units are not to be stored data, wherein the memory management circuit is further configured to program data corresponding to the write command into a third physical erasing unit among the second physical erasing units by using a multi-page programming mode if the second determination parameter is less than the second threshold value, wherein each memory cell of a physical erasing unit programmed by using the multi-page programming mode stores a plurality of data bits.

11. The memory control circuit unit according to claim 10, wherein in the operation of obtaining the valid data parameter based on the valid data amount of the valid data stored in the at least a part of the physical erasing units, the memory management circuit is further configured to divide the valid data amount by a predetermined capacity to calculate a valid number corresponding to the valid data to obtain the valid data parameter.

12. The memory control circuit unit according to claim 10, wherein in the operation of obtaining the first threshold value based on the valid data parameter, the memory management circuit is further configured to subtract a calculation parameter by the valid data parameter and a first predetermined parameter to obtain the first threshold value, wherein the calculation parameter corresponds to a number of the physical erasing units.

13. The memory control circuit unit according to claim 10, wherein the memory management circuit is further configured to program the data corresponding to the write command into the third physical erasing unit by using the multi-page programming mode if the valid data parameter is less than the second threshold value.

14. The memory control circuit unit according to claim 13, wherein the memory management circuit is further configured to program the data corresponding to the write command into the third physical erasing unit by using the single-page programming mode if the second determination parameter is not less than the second threshold value and the valid data parameter is not less than the second threshold value.

15. The memory control circuit unit according to claim 10, wherein the second threshold value is less than the first threshold value, and a difference value between the first threshold value and the second threshold value is equal to a predetermined difference value.

16. The memory control circuit unit according to claim 10, wherein in the operation of obtaining the second threshold value based on the valid data parameter, the memory management circuit is further configured to subtract a calculation parameter by the valid data parameter and a second predetermined parameter to obtain the second threshold value, wherein the calculation parameter corresponds to a number of the physical erasing units.

17. A memory storage device, comprising:
a connection interface unit, configured to be connected to a host system;
a rewritable non-volatile memory module, having a plurality of physical erasing units; and
a memory control circuit unit, connected to the connection interface unit and the rewritable non-volatile memory module,
wherein the memory control circuit unit is configured to receive a write command from the host system,
wherein the memory control circuit unit is further configured to obtain a valid data parameter based on a valid data amount of valid data stored in at least a part of the physical erasing units,
wherein the memory control circuit unit is further configured to obtain a first threshold value and a second threshold value based on the valid data parameter,
wherein the memory control circuit unit is further configured to obtain a first determination parameter based on a number of a plurality of first physical erasing units among the physical erasing units, wherein the first physical erasing units are programmed for storing data by using a single-page programming mode, and each memory cell of a physical erasing unit programmed by using the single-page programming mode stores one data bit,
wherein the memory control circuit unit is further configured to perform a garbage collection operation if the first determination parameter is greater than the first threshold value,
wherein the memory control circuit unit is further configured to obtain a second determination parameter based on a number of a plurality of second physical erasing units among the physical erasing units, wherein the second physical erasing units are not to be stored data,
wherein the memory control circuit unit is further configured to program data corresponding to the write command into a third physical erasing unit among the second physical erasing units by using a multi-page programming mode if the second determination parameter is less than the second threshold value, wherein each memory cell of a physical erasing unit programmed by using the multi-page programming mode stores a plurality of data bits.

18. The memory storage device according to claim 17, wherein in the operation of obtaining the valid data parameter based on the valid data amount of the valid data stored in the at least a part of the physical erasing units, the memory control circuit unit is further configured to divide the valid data amount by a predetermined capacity to calculate a valid number corresponding to the valid data to obtain the valid data parameter.

19. The memory storage device according to claim 17, wherein in the operation of obtaining the first threshold value based on the valid data parameter, the memory control circuit unit is further configured to subtract a calculation parameter by the valid data parameter and a first predetermined parameter to obtain the first threshold value, wherein the calculation parameter corresponds to a number of the physical erasing units.

20. The memory storage device according to claim 17, wherein the memory control circuit unit is further configured to program the data corresponding to the write command into the third physical erasing unit by using the multi-page programming mode if the valid data parameter is less than the second threshold value.

21. The memory storage device according to claim 20, wherein the memory control circuit unit is further configured to program the data corresponding to the write command into the third physical erasing unit by using the single-page programming mode if the second determination parameter is not less than the second threshold value and the valid data parameter is not less than the second threshold value.

22. The memory storage device according to claim 17, wherein in the operation of obtaining the second threshold value based on the valid data parameter, the memory control circuit unit is further configured to subtract a calculation parameter by the valid data parameter and a second predetermined parameter to obtain the second threshold value, wherein the calculation parameter corresponds to a number of the physical erasing units.

* * * * *